Patented Aug. 17, 1937

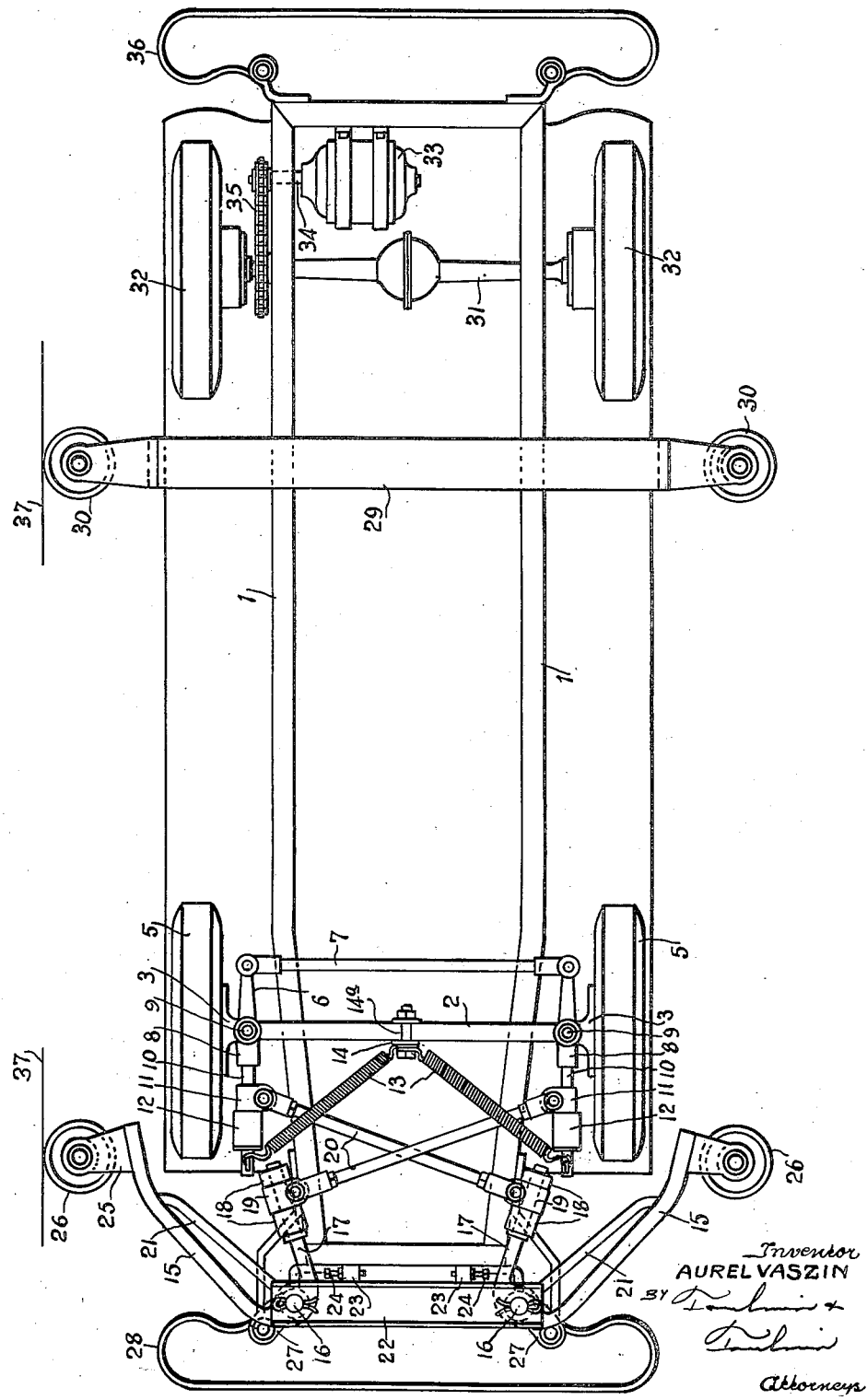

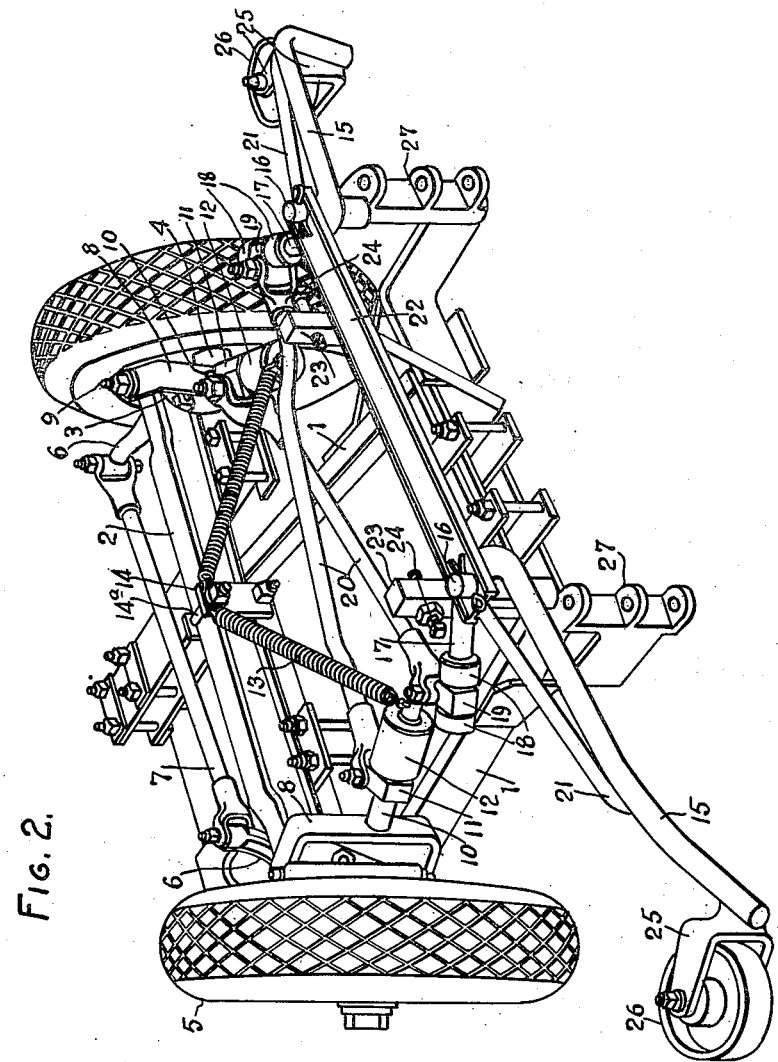

2,090,409

UNITED STATES PATENT OFFICE 2,090,409

AMUSEMENT DEVICE

Aurel Vaszin, Dayton, Ohio

Substitute for application Serial No. 735,393, July 16, 1934. This application August 10, 1936, Serial No. 95,197

18 Claims. (Cl. 104—247)

This invention relates to improvements in amusement devices, such as are used in amusement parks for conveyance of sightseers.

It is an object of this invention to provide an electrically driven, automatically steered vehicle for the transportation of passengers, especially children, over an especially prepared trackway provided therefor.

It is also an object of this invention to provide an amusement vehicle having laterally disposed instrumentalities for steering the vehicle by properly acting upon wheels especially prepared for steering purposes.

These and other advantages will appear from the following description taken in connection with the drawings.

This application is a substitute for my application Serial No. 735,393, filed July 16, 1934.

Referring to the drawings:

Figure 1 is a bottom plan view of the vehicle.

Figure 2 is a bottom perspective of the front end of the vehicle.

The main parts of the running gear and supporting structure of the vehicle are shown in Figure 2, in which there is a longitudinally disposed frame 1 supported at one end on a front axle 2 and at its rear end on a rear axle 31. At each end of the front axle is a yoke 3, which has pivotally mounted therein a spindle 4 for supporting a wheel 5 on the end of the axle. To each spindle is attached one end of a rearwardly extending arm 6. These arms are connected by means of a link 7 which extends between the free ends of the arms.

To each axle yoke is attached a yoke 8 by means of a bolt or pin 9 which extends through the yokes 3 and 8 and the spindle 4. The yokes 8 extend forwardly and each has attached thereto one end of an arm 10. Each arm 10 has intermediate its ends a cuff 11, and adjacent the cuff a roller 12. The free ends of the arms 10 are connected by means of springs 13 and links 14 attached to the central part of the front axle by means of bolts 14a. These springs serve to hold the arms 10 with the rollers 12 thereon in a definite, correlated position between the two front wheels so that the rollers 12 are out of contact with the wheels and spaced therefrom.

Extending laterally from each side of the frame, at the front end thereof, is one arm 15 of a bellcrank lever pivoted by means of a pivot pin 16 to the corner of the front end of the frame. Each bellcrank lever has a second arm 17 which projects rearwardly and has on its free end spaced sleeves 18. Between the sleeves 18 of each arm 17 is a cuff 19, to which one end of a link 20 is attached. The other end of each link is attached to one of the cuffs 11. The cuff 11 on the righthand side of the vehicle is attached to the cuff 19 on the lefthand side of the vehicle, while the cuff 11 on the lefthand side of the vehicle is attached to the cuff 19 on the righthand side of the vehicle.

For the purpose of bracing the two arms of each bellcrank lever there is provided a brace member 21. The pivot pins 16 are connected by means of a bar 22. This bar serves to brace the ends of these pins. Adjacent each pivot pin and to the rear of the bar 22 is a stop post 23, which has therein an adjustable screw or bolt 24 for engagement by the arm 17 to limit the swinging movements of the arms 15 and also to limit the outward swinging movements of the arms 10 and the rollers 12 thereon. These stop posts and the adjustable screws thereon prevent the rollers 20 from engaging the wheels during a straight and forward movement of the vehicle.

On the free end of each arm 15 is a yoke 25 which has mounted thereon a roller 26 adapted to engage the side walls of the trackway over which the vehicle passes. The front end of the frame is provided with brackets 27 for supporting a front bumper or bumpers 28. Extending across the frame and laterally thereof is a cross bar 29, which has on each end a roller 30. These rollers are in alignment with the rollers 26 on the ends of the arms 15, and are adapted to engage the side walls of the trackway to guide the vehicle and keep it in its proper course. While this cross bar is shown in front of the rear wheels it may be located to the rear of said wheels.

On the rear axle 31 are the usual wheels 32. These are the traction wheels and are caused to rotate by means of a motor 33, a motor shaft 34 and a sprocket chain 35 connecting sprockets on the motor shaft to the rear axle. The vehicle is also supplied with a rear bumper 36 attached to and supported by the frame of the vehicle. The numeral 37 is used to designate a diagrammatic illustration of the side walls of the trackway.

The trackway may be straight or curved. When a curve in the trackway is reached one of the rollers 26 will be engaged by the wall thereof so that the arm 15 supporting the roller will be moved so that one of the rollers 12 will engage with the side of one of the wheels 5, thereby turning the wheel so that the direction of movement of the vehicle is changed.

The steering instrumentality being located on the front end of the vehicle will cause the wheels to be operated to change the course of the vehicle before the main body of the car reaches the curve. That is, when the front wheels are entering the curved zone they are turned to steer the car so it will pass around the curve. As soon as the wheels are turned the pressure on the roller on the side of the trackway is relieved.

The roller on one side of the vehicle tends to steer the vehicle in one direction, while the roller on the other side steers the vehicle in the reverse direction. When the trackway is straight the arms 15 are brought into extended positions by the operation of the springs 13 so that the rollers 12 are in a neutral, non-steering position so that the wheels can operate freely for the movement of the vehicle along the trackway. Through the operation of the springs 13 the steering mechanism offers no impediment to the rotation of the front wheels and their free movement, except on curves. The operation of the steering mechanism is automatic in all respects.

It will be understood that I desire to comprehend within my invention such modifications as come within the scope of my claims and my invention.

Having thus fully described my invention what I claim as new and desire to secure by Letters Patent, is:

1. In combination, in an amusement vehicle, a frame, a pair of wheels supporting the frame at one end, and means engageable with said wheels and having a portion projecting laterally of the frame to engage a guide, the engagement of said means with said wheels being arranged to steer said wheels away from said guide upon engagement of the projecting portion with said guide.

2. In combination, in an amusement vehicle, a frame, a pair of wheels supporting the frame at one end, and means supported independently of the wheels but engageable therewith and having a portion extending laterally of the frame to engage a guide, the engagement of said means with said wheels being arranged to steer said wheels away from said guide upon engagement of said laterally extending portion with said guide.

3. In combination, in an amusement vehicle, a frame having an axle thereon, a spindle pivotally mounted on each end of the axle, a wheel on each spindle, and means on the frame to engage the wheels to steer the vehicle.

4. In combination, in an amusement vehicle, a frame having an axle thereon, a spindle pivotally mounted on each end of the axle, a wheel on each spindle, and means on the frame and extending laterally thereof to engage the wheels to steer the vehicle.

5. In combination, in an amusement vehicle, a frame having an axle thereon, a spindle pivoted to each end of the axle, each spindle having an arm, a link connecting the arms, a wheel on each spindle, and means on the frame adapted to alternately engage the wheels to steer the vehicle.

6. In combination, in an amusement vehicle, a frame having an axle thereon, a spindle pivoted to each end of the axle, each spindle having an arm, a link connecting the arms, a wheel on each spindle, and means on the frame and extending laterally thereof adapted to alternately engage the wheels to steer the vehicle.

7. In combination, in an amusement vehicle, a frame having an axle thereon, a spindle pivoted to each end of the axle, a wheel on each spindle, means to connect the spindles so they will turn together on their pivots, an arm pivotally supported to swing with relation to the frame, and means on the arm to engage a wheel to steer the vehicle.

8. In combination, in an amusement vehicle, a frame having an axle thereon, a spindle pivoted to each end of the axle, a wheel on each spindle, means to connect the spindles so they will turn together on their pivots, an arm pivotally supported to swing with relation to the frame, and a roller on the arm to engage the wheel to steer the vehicle.

9. In combination, in an amusement vehicle, a frame having an axle thereon, a spindle pivoted to each end of the axle, a wheel on each spindle, means to connect the spindles so they will turn together on their pivots, a pair of arms, each arm being pivoted to swing with relation to the frame, and a roller on each arm to engage a wheel to steer the vehicle.

10. In combination, in an amusement vehicle, a frame having an axle thereon, a spindle pivoted to each end of the axle, a wheel on each spindle, means to connect the spindles so they will turn together on their pivots, a pair of arms, each arm being pivoted to swing with relation to the frame and having thereon a roller to engage a wheel to steer the vehicle, and means extending laterally of the frame to actuate the arms to bring the rollers against the wheels to steer the vehicle.

11. In combination, in an amusement vehicle, a frame having an axle thereon, a spindle pivoted to each end of the axle, a wheel on each spindle, means to connect the spindles so they will turn together on their pivots, a pair of arms, each arm being pivoted to swing with relation to the frame and having thereon a roller to engage a wheel to steer the vehicle, and means extending laterally of the frame to actuate the arms to bring the rollers against the wheels to steer the vehicle, said means comprising a pair of levers, each lever being operatively connected to one of the arms.

12. In combination with a trackway having side walls and a vehicle adapted to travel in the trackway, a frame for the vehicle, a pair of spindles pivoted to the frame, a wheel on each spindle, an arm pivotally supported adjacent each wheel, a roller on each arm to engage a wheel, and means on the frame adapted to be engaged by the side walls to move the arms to bring the rollers against the wheel, whereby the vehicle is steered.

13. In combination with a vehicle and a trackway therefor having side walls, a frame having an axle thereon, a spindle for each end of the axle pivoted thereto, a wheel on each spindle, an arm pivoted to the axle adjacent each wheel, a roller on each arm for engagement with the adjacent wheel, a lever at each side of the frame pivoted thereto, a roller on one end of each lever for engagement with a side wall, and means connecting the levers to the arms so that when the roller on one of the levers engages a side wall a roller on an arm will be brought into engagement with a wheel to steer the vehicle away from the engaged wall.

14. In combination with a vehicle and a trackway therefor having side walls, a frame having an axle thereon, a spindle for each end of the axle pivoted thereto, a wheel on each spindle, an arm pivoted to the axle adjacent each wheel, a roller on each arm for engagement with the adjacent wheel, means acting on the arm to hold the rollers away from the wheels, a lever at each side of the frame pivoted thereto, a roller on one end of each lever for engagement with a side wall, and means connecting the levers to the arms so that when the roller on one of the levers engages a side wall a roller on an arm will be brought into engagement with a wheel to steer the vehicle away from the engaged wall.

15. In combination with a vehicle and a trackway therefor having side walls, a frame having an axle thereon, a spindle for each end of the axle pivoted thereto, a wheel on each spindle, an arm pivoted to the axle adjacent each wheel, a roller on each arm for engagement with the adjacent wheel, a laterally extending lever on each side of the frame, a roller on one end of each lever for engagement with a side wall, means connecting the levers to the arms so that when the roller on one of the levers engages a side wall a roller on an arm will be brought into engagement with a wheel to steer the vehicle away from the engaged wall, and means acting on the arms to hold the levers in laterally extending positions.

16. In combination with a vehicle and a trackway therefor having side walls, a frame having an axle thereon, a spindle for each end of the axle pivoted thereto, a wheel on each spindle, an arm pivoted to the axle adjacent each wheel, a roller on each arm for engagement with the adjacent wheel, a laterally extending lever on each side of the frame, a roller on one end of each lever for engagement with a side wall, means connecting the levers to the arms so that when the roller on one of the levers engages a side wall a roller on an arm will be brought into engagement with a wheel to steer the vehicle away from the engaged wall, and means acting on the arms to hold the levers in laterally extending positions, said means consisting of springs attached to the arms and to the axle.

17. In an amusement vehicle, a frame, a pair of wheels mounted on the frame to swing for steering purposes, an arm for each wheel pivotally supported at one end by the frame and having a roller to engage the wheel to steer the vehicle, and means on the frame to operate the arms to steer the vehicle.

18. In an amusement vehicle, a frame, a pair of wheels mounted on the frame to swing for steering purposes, an arm for each wheel pivotally supported at one end by the frame and having a roller to engage the wheel to steer the vehicle, and means on the frame to operate the arms to steer the vehicle, said means comprising a pair of laterally extending levers pivotally supported by the frame, each lever being connected at one end to an arm and having on its other end a roller to engage part of a trackway.

AUREL VASZIN.